United States Patent [19]

Grant et al.

[11] Patent Number: 4,982,445
[45] Date of Patent: Jan. 1, 1991

[54] LASER BEAM COMMUNICATION BETWEEN SPACECRAFT

[75] Inventors: Michael A. Grant; David Robson, both of Stevenage, England; Nicholas F. Matthews, Plainsboro, N.J.

[73] Assignee: British Aerospace Public Limited Company, London, England

[21] Appl. No.: 273,530

[22] Filed: Nov. 21, 1988

[30] Foreign Application Priority Data

Nov. 20, 1987 [GB] United Kingdom ............... 8727252

[51] Int. Cl.$^5$ ............................................. H04B 10/00
[52] U.S. Cl. ............................. 455/606; 250/491.1; 350/142; 455/600
[58] Field of Search ............ 455/600, 606, 607, 617, 455/618, 619; 370/3; 250/234, 236, 491.1; 350/605, 606; 356/138, 142, 399

[56] References Cited

U.S. PATENT DOCUMENTS 4,696,062  9/1987  LaBudde ............................ 455/612
4,800,556  1/1989  Charlier ............................ 455/618

OTHER PUBLICATIONS

Auer, W., "Pointing, Acquisition and Tracking for Intersatellite Optical Data Links", Proceedings of ESA Workshop on Space Laser Application and Technology, Les Diablerets, Mar. 26–30, 1984 (Published ESA SP 202, May, 1984), pp. 131–137.

Primary Examiner—Joseph A. Orsino
Assistant Examiner—L. Van Beek
Attorney, Agent, or Firm—Cushman, Darby & Cushman

[57] ABSTRACT

A laser beam communication system for spacecraft in which each communication terminal comprises, for steering the beam projected from that terminal, four mirrors, each mounted on a mechanism capable of rotating the mirror about a constant defined axis. The mirrors and their attached mechanisms are arranged in pairs with one pair on either side of a magnifying telescope. All rotating joints in each mechanism are constructed using flexure pivots. Such a pointing element can provide both the range and accuracy required for an important class of free space laser links without introducing any extra friction into the pointing system.

3 Claims, 1 Drawing Sheet

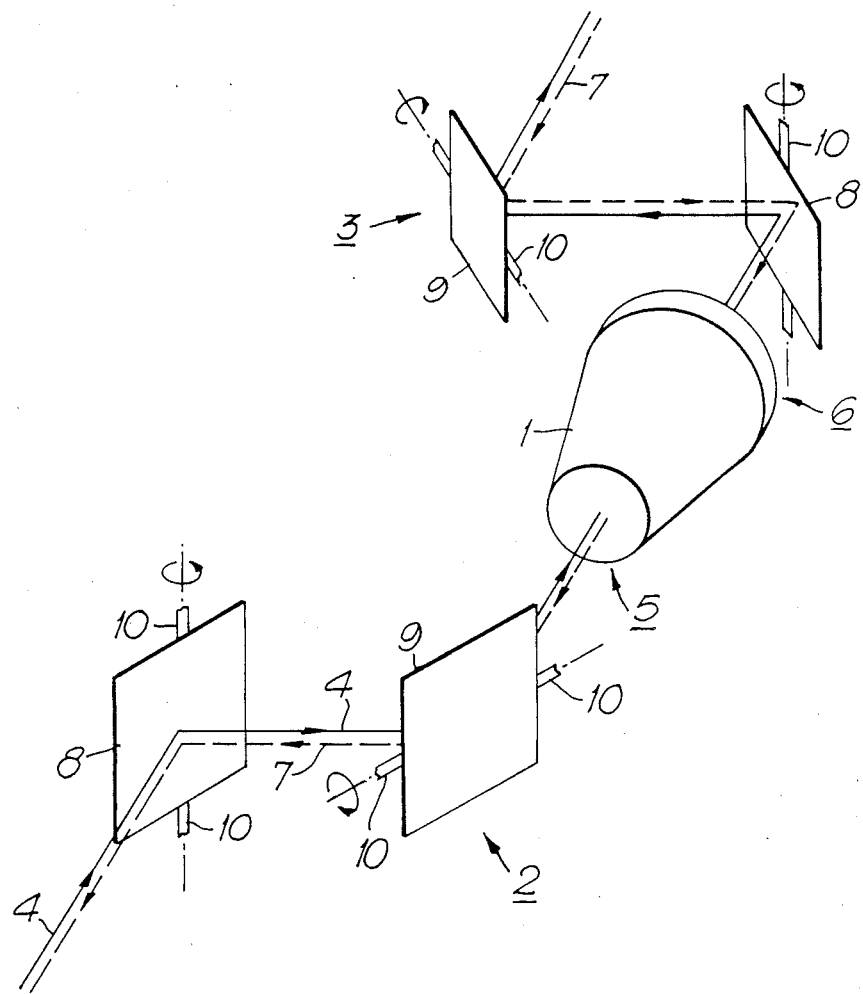

LASER BEAM COMMUNICATION BETWEEN SPACECRAFT

BACKGROUND OF THE INVENTION

Field of the Invention

This invention relates to "free space laser communications systems" i.e. systems in which laser beams are used to communicate between two spacecraft, for example two orbiting satellites. In prior art space communication systems spacecraft is provided with means for directing a laser beam towards the other and a receiver for receiving the beam sent from the other. The beam directing means includes a laser source and projection optics, and a pointing system for steering the projected beam. The laser power is limited so each beam must be kept narrow and pointed very accurately at the other spacecraft. To achieve accurate pointing and then to maintain it in the face of relative movement of the two spacecraft, each spacecraft comprises a radiation sensitive position sensor which is activated by a part of the laser power arriving from the partner and which controls the pointing system (for example an arrangement of servo controlled mirrors). Clearly, the range of deflection of the projected beam must be sufficient to cover all possible positions of the partner as orbital motion changes the orientation between the two spacecraft. To achieve the combination of a large deflection range and great accuracy, the pointing system may comprise two cascaded pointing mechanisms i.e. a fine pointing mechanism with a narrow range but high accuracy and a coarse pointing mechanism with a larger range but poorer accuracy. Each mechanism comprise two movable mirrors, one for each deflection axis.

However, disturbances to the beam pointing may arise principally from any friction present in the pointing mechanisms, from the vibrational motion of each spacecraft and from less than perfect performance of each position sensor.

With reference to the friction effect, great improvement is possible by making use of so-called flexure suspension for the movable mirrors rather than the conventional sliding bearings. However, this is normally only feasible for the fine pointing mechanism because a flexure suspension would not be able to provide the range of movement required for the coarse mechanism.

SUMMARY OF THE INVENTION

According, one object of the invention is to reduce the friction effects in a system of the kind set forth. A further object is to provide a means whereby flexure mechanisms can be used for both the fine and coarse pointing mechanisms of that system.

According to one aspect of the invention, there is provided:

A laser beam communication system for communication between two spacecraft each of which has a laser beam communication transmitter/receiver, comprising first and second pointing mechanisms for steering a laser beam projected between the two spacecraft, each pointing mechanism comprising flexure pivot means and a pair of servo-controlled mirrors supported by said flexure pivot means for turning about respective transverse axes, and magnifying optical means positioned between the first and second pointing mechanisms for transmitting the laser beam therebetween to increase the deflection range of said beam over a given range of movement of the pair of mirrors of one of said pointing mechanisms.

According to a second aspect of the invention, there is provided a spacecraft comprising: A laser beam communication system for communication between two spacecraft each of which has a laser beam communication means, comprising first and second laser beam pointing mechanisms, each mechanism including flexure pivots and two mirrors respectively supported by said flexure pivots for turning about respective transverse axes, and a magnifying optical telescope for increasing the deflection range of said laser beam over a given range of movement of the pair of mirrors of one of said the pointing mechanisms, said telescope positioned between the first and second beam pointing mechanisms so that a laser beam reflected from the first pointing mechanism, passes through the telescope, is reflected from the mirrors of the second pointing mechanism, and is projected into space.

BRIEF DESCRIPTION OF THE DRAWINGS

For a better understanding of the invention, reference will be made, by way of example, to the accompanying drawings.

FIG. 1 is a perspective view of a free-space laser communications system according to one embodiment of the present invention.

DETAILED DESCRIPTION OF THE PREFERRED EMBODIMENTS

Referring to FIG. 1, the system includes a communication transmitter/receiver on each spacecraft (not shown) which transmitter/receiver includes a telescope 1 positioned between two pointing mechanisms 2 and 3 such that a laser beam 4, received from a laser source and beam forming optics (not shown) forming part of the same transmitter/receiver, passes via the mechanism 2 into the image plane side 5 of the telescope, leaves the telescope at its objective plane side 6 and then, via the mechanism 3, is projected out into space. Similarly, beam 7 received from like communications equipment on board the other spacecraft is received via mechanism 3 into the objective plane side of the telescope and leaves the telescope at its image plane side to reach the mechanism 2. From mechanism 2, beam 7 is split from beam 4, e.g. by a dichroic beam splitter (not shown) and passed to a communication receiver detector and to a position detector (not shown).

Each of the mechanisms 2 and 3 comprises two mirrors 8 and 9 supported by flexure pivots 10 for rotation about respective axes which are at right angles to one another. By the term flexure pivots is meant the kind of pivot which comprises a spring or flexible element connected to the item which is to rotate and to a fixed member with respect to which the item is to rotate and which permits such rotation by virtue of distortion, for example torsional distortion of the element. This contrasts with the kind of pivot where there is a fixed and a movable element which is in sliding or rolling engagement with the fixed element, e.g. a bush and spigot bearing. Flexure pivots are subject to very small friction effects but generally do not give the range of movement of a sliding type bearing. Each mirror is coupled to a servo-motor (not shown) which controls the position of the mirror in response to signals from an electronic control unit (not shown).

Within each pointing mechanism 2 and 3, the two mirrors 8 and 9 are arranged with their rotation axes at right angles and suitably separated in space such that a laser beam will strike first one and then the other. By rotating the mirrors about their respective axes beam, deflection in two orthogonal directions is achieved.

The mechanisms are arranged on either side of the telescope such that a laser beam will be deflected by the pair of mirrors mounted on one side of the telescope, pass through the telescope, and be deflected by the second pair of mirrors.

Because the linear diameter of the beam is larger on the object side of the telescope it is necessary for the mirrors on the object side of the telescope to be larger in diameter than those on the image side by a factor of the telescope magnification.

As in previous designs, the approach to satisfy the requirement for a large dynamic range is to cascade two pointing mechanisms per axis. The pointing mechanism on the image side of the telescope is a fine mechanism as previously referred to, and consequently a flexure type suspension is feasible.

The illustrated system is most applicable for one particular type of free space link, that is one where each spacecraft does not change its position relative to the other over a range larger than around plus or minus 10 degree. A lower Earth orbiting satellite observed from a geosynchronous satellite would fit into this requirement. So would several 'alternative' partners which were closely spaced along the geosynchronous are, such as domestic telecommunications relay satellites.

For these systems flexure pivots may be used on both sides of the telescope because the mechanism on the object side of the telescope can achieve a range of plus or minus 10 degrees. In this way neither pair of mechanisms introduces friction.

It should be understood that the present invention is not limited to the aforementioned embodiments. Various modifications will be apparent to those skilled in the art without departing from the scope and spirit of the invention. Such modifications are intended to be included in this application as defined by the following claims.

We claim:

1. A laser beam communication system for communication between two spacecraft each of which has a laser beam communication transmitter/receiver, comprising:
    first and second pointing mechanisms for steering a laser beam projected between the two spacecraft,
    each pointing mechanism comprising flexure pivot means, which includes a spring, and a pair of servo-controlled mirrors supported by said flexure pivot means for turning about respective transverse axes; and
    magnifying optical means positioned between the first and second pointing mechanisms for transmitting the laser beam therebetween to increase the deflection range of said beam over a given range of movement of the pair of mirrors of one of said pointing mechanisms.

2. The laser beam communication system according to claim 1, wherein the flexure pivot means further comprises a flexible member which is capable of torsional distortion and is axially connected between one of said servo-controlled mirrors and a fixed surface for allowing said mirror to rotate about the axis.

3. A laser beam communication system for communication between two spacecraft each of which has a laser beam communication means, comprising:
    first and second laser beam pointing mechanisms, each mechanism including springs and two mirrors respectively supported by said springs for turning about respective transverse axes; and
    a magnifying optical telescope for increasing the deflection range of said laser beam over a given range of movement of the pair of mirrors of one of said pointing mechanisms, said telescope positioned between the first and second beam pointing mechanisms so that a laser beam reflected from the first pointing mechanism, passes through the telescope, is reflected from the mirrors of the second pointing mechanism, and is projected into space.

* * * * *